United States Patent
Hiranuma (10) Patent No.: US 7,354,536 B2
(45) Date of Patent: Apr. 8, 2008

(54) METHOD OF MANUFACTURING AN OPTICAL COMPONENT HAVING A HOLDER

(75) Inventor: Yuji Hiranuma, Tokyo (JP)

(73) Assignee: Nippon Sheet Glass Co., Ltd., Tokyo (JP)

(*) Notice: Subject to any disclaimer, the term of this patent is extended or adjusted under 35 U.S.C. 154(b) by 315 days.

(21) Appl. No.: 11/175,214

(22) Filed: Jul. 7, 2005

(65) Prior Publication Data
US 2006/0006557 A1    Jan. 12, 2006

(30) Foreign Application Priority Data
Jul. 8, 2004    (JP)    ............ P2004-201238

(51) Int. Cl.
B29C 43/18    (2006.01)
(52) U.S. Cl. ............ 264/1.32; 264/1.7; 264/267; 264/268; 264/273; 264/274; 264/259
(58) Field of Classification Search ............ None
See application file for complete search history.

(56) References Cited

U.S. PATENT DOCUMENTS

| 4,629,489 | A | * | 12/1986 | Hirota et al. | ............ 65/102 |
| 5,173,100 | A | * | 12/1992 | Shigyo et al. | ............ 65/102 |
| 5,378,255 | A | * | 1/1995 | Ito | ............ 65/64 |
| 6,009,725 | A | * | 1/2000 | Hirota et al. | ............ 65/25.1 |
| 6,560,040 | B2 | * | 5/2003 | Kaneko et al. | ............ 359/739 |
| 7,204,649 | B2 | * | 4/2007 | Tanaka | ............ 385/93 |
| 2004/0174618 | A1 | * | 9/2004 | Kikuchi | ............ 359/811 |

FOREIGN PATENT DOCUMENTS

| JP | 61-114822 | 6/1986 |
| JP | 3-265529 | 11/1991 |
| JP | 9-230179 | * 9/1997 |
| JP | 200-7355 | * 1/2000 |

* cited by examiner

Primary Examiner—Edmund H. Lee
(74) Attorney, Agent, or Firm—Whitham Curtis Christofferson & Cook, P.C.

(57) ABSTRACT

A method of manufacturing an optical component having an optical element and a holder attached to the optical element, comprising the steps of: inserting a blank for the optical element into a through hole of the holder wherein the through hole has a narrowed portion at which the blank is prevented from passing through the through hole; sucking at least the blank from an upper side thereof in a state where the blank is inserted into the through hole; transporting the holder and the blank simultaneously to a molding device; placing the blank on a molding surface of the molding device; and heating and pressurizing the blank in the molding device so that the blank is deformed to obtain a predetermined optical surface and is press-fitted to an inner face of the holder.

7 Claims, 9 Drawing Sheets

METHOD OF MANUFACTURING AN OPTICAL COMPONENT HAVING A HOLDER

BACKGROUND OF THE INVENTION

1. Field of the Invention

The present invention relates to a method of manufacturing an optical component by die molding, and particularly to a production method in which an optical component is molded integrally with a holder.

2. Related Art

An optical component (or, optical element) such as a lens is often used while being housed in a holding member (holder) made of a metal or the like. The function of an optical component may be impaired by stain or scratch, and hence it is difficult to handle an optical component. When a holder is previously disposed, it is not required to handle an optical component with directly contacting the component, also in a step of incorporating the component into a machine or the like, so that occurrence of stain or scratch can be reduced.

In an optical component having an optical element and a holder in which the optical element such as a lens is made of glass, a resin, or the like and fixed into the holder, the holder and the optical element may be separately produced and then fixed together by adhesion. Alternatively, such an optical component having a holder is sometimes produced by a method in which a blank for the optical element is pressurized and deformed in the holder, and an optical surface is formed simultaneously with press fixation to the holder (for example, JP-A-61-114822 and JP-A-3-265529).

Figure 1A:
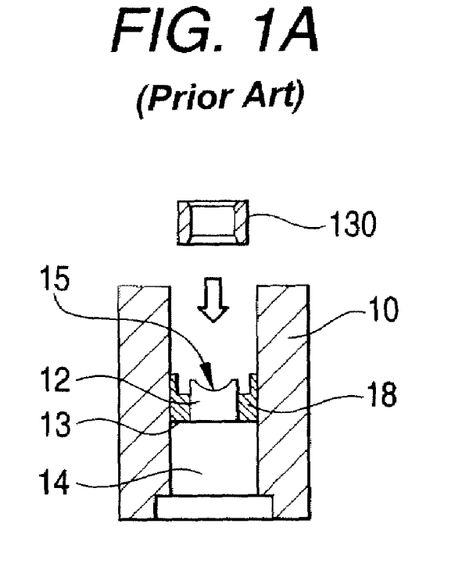
FIGS. 1A through 1D are views illustrating a conventional procedure in the production of a lens having a holder.
Figure 1B:
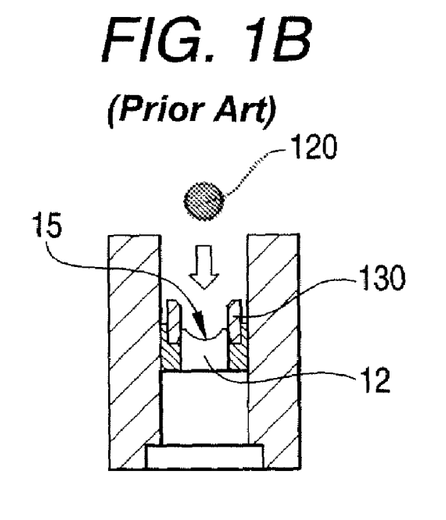

FIGS. 1A through 1D show a conventional procedure in the production of an aspherical lens by such a molding method. Hereinafter, the identical components are denoted by the same reference numerals, and their description may be often omitted. As shown in FIG. 1A, first, a lower die 12 is incorporated in a cylindrical barrel die 10 with upward directing a molding surface 15. In the lower die, a step 13 is formed, and a lower portion 14 has a larger diameter. A cylindrical inner sleeve 18 which is an auxiliary member is placed on the step 13. In this state, first, a lens holder 130 made of a metal is inserted from an upper portion of the barrel die 10, and placed at a predetermined position of the inner sleeve 18. As shown in FIG. 1B, then, a lens blank 120 is inserted into a through hole of the lens holder 130, and placed on the molding surface 15 of the lower die 12.

Figure 2A:
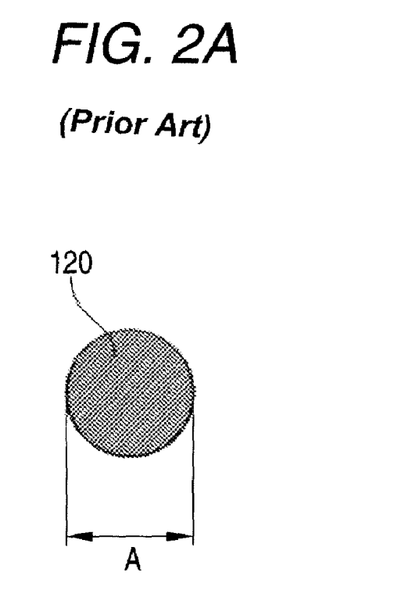
FIGS. 2A and 2B are views showing a conventional example of a lens blank and a lens holder.
Figure 2B:
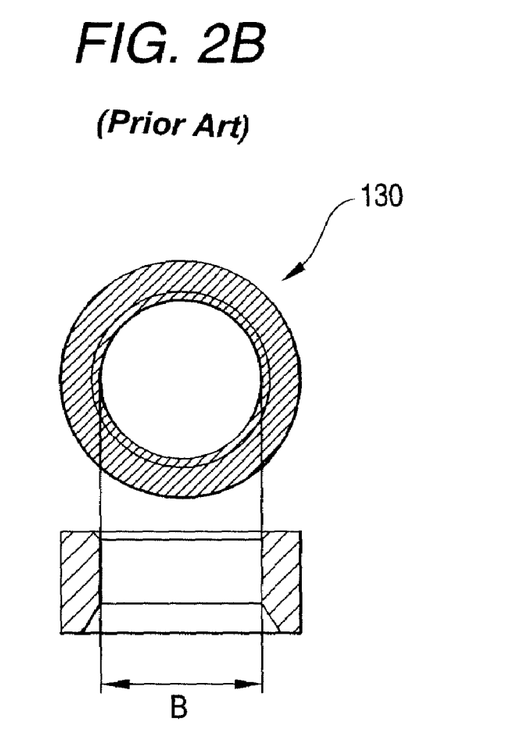

The lens blank 120 is made of a glass material, and processed into a spherical shape as shown in FIG. 2A. The lens holder 130 has a cylindrical shape as shown in FIG. 2B, and comprises a through hole having a circular section shape. The inner diameter B of the through hole must be larger than the diameter A of the lens blank 120. The relationship between A and B must be designed so that the lens after shaping is in close contact with the lens holder, and an excess of the blank is not produced.

Figure 1C:
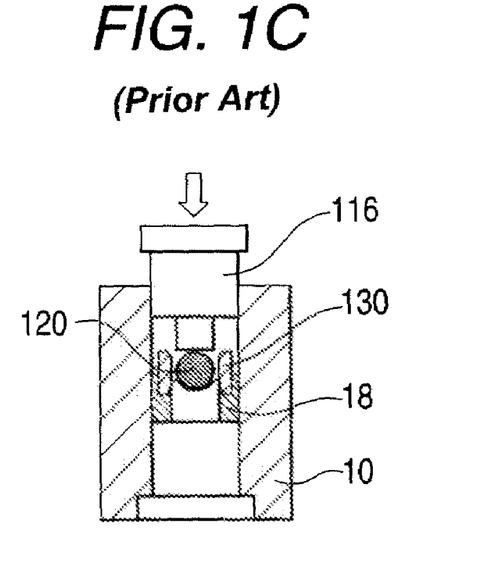

In this state, as shown in FIG. 1C, an upper die 116 is inserted and lowered into the upper portion of the barrel die 10 to press the lens blank 120 which is softened by heating to a predetermined temperature. As a result of the above procedure, as shown in FIGS. 2A and 2B, a molded product 122 which is defined by the shapes of the lower and upper dies 12, 116 and the lens holder 130 is formed. The molded product 122 is fixed to the lens holder 130, but is not fixed to the lower and upper dies 12, 116 which are previously subjected to a releasing process, and can be released from the dies.

Figure 1D:
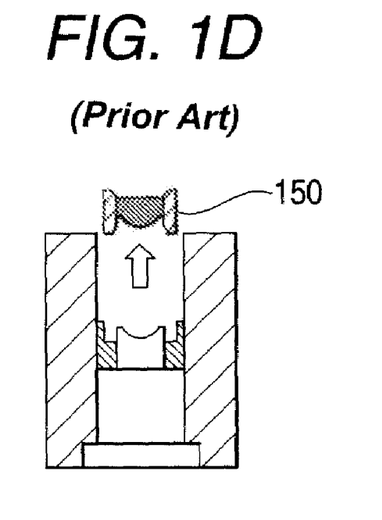

After the molding process is completed, as shown in FIG. 1D, the upper die is removed away, and an aspherical lens 150 having a holder is taken out. A holder and a lens blank are newly prepared, and the same procedure is conducted, whereby an aspherical lens having a holder can be repeatedly produced. According to this apparatus, only the upper die is taken out, and the other members are not required to be reassembled. Therefore, the repeated production is enabled within a short time period.

The lens holder is usually transported onto the inner sleeve while being mechanically grasped or sucked by vacuum suction. The lens holder 130 has the through hole 136. In order to mechanically grasp the lens holder, therefore, means such as that a tweezers-like grasping tool 160 grasps an outer peripheral portion 132 as shown in FIG. 3A, or that the tool outward pushes an inner peripheral portion 134 to hold the lens holder as shown in FIG. 3B is taken.

Figure 3A:
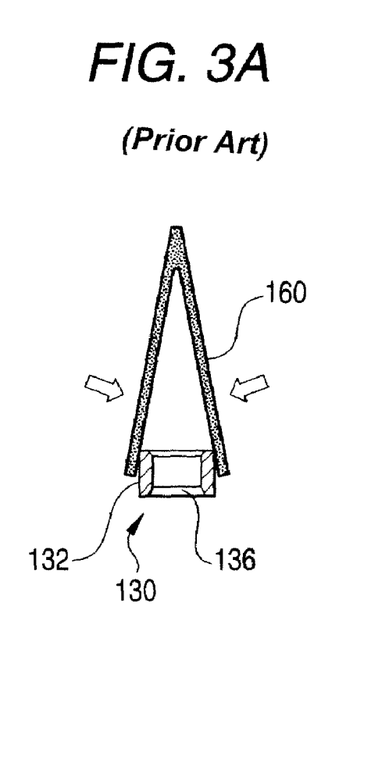
FIGS. 3A through 3D are views showing conventional methods of transporting a lens holder.
Figure 3B:
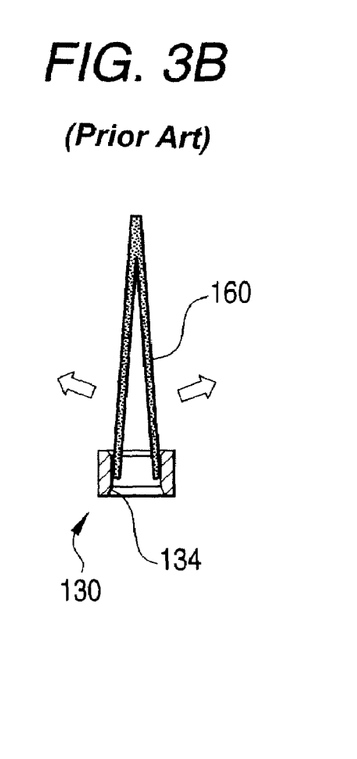
Figure 3C:
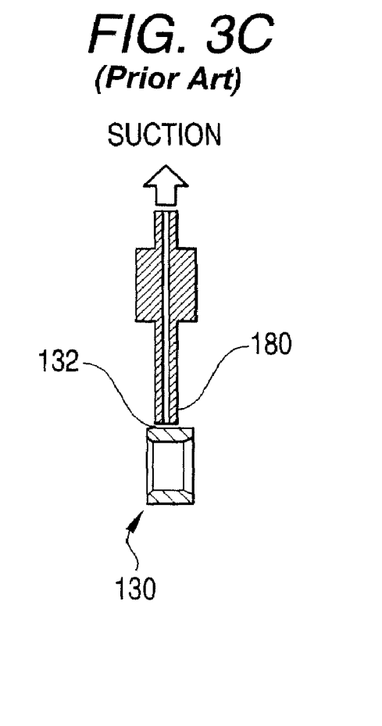

When vacuum suction is employed, a method such as that in which suction is conducted while a suction port 180 is in contact with a side face 132 as shown as shown in FIG. 3C, or that in which suction is conducted while the suction port is in contact with an end face 138 that is deviated from the center, and that has a small area is selected.

In the conventional method, the two transportation works of placing the lens holder onto the inner sleeve, and then transporting the lens blank to the lower-die surface in the through hole of the lens holder are required. Therefore, there is a problem in that the working efficiency is poor.

Each of the lens holder transporting methods shown in FIGS. 3A through 3D has a problem. In the method of FIG. 3A, the grasping tool 160 is placed outside the lens holder 130, and hence a room for allowing the grasping tool 160 to pass must be formed between the outer diameter of the lens holder 130 and the diameter of the inner periphery of the barrel die. The upper and lower dies and the like must be correspondingly produced in a larger size, and the cost of the production apparatus is increased. In the method of FIG. 3B, the lens holder is unstably held, and therefore easily drops during transportation.

Figure 3D:
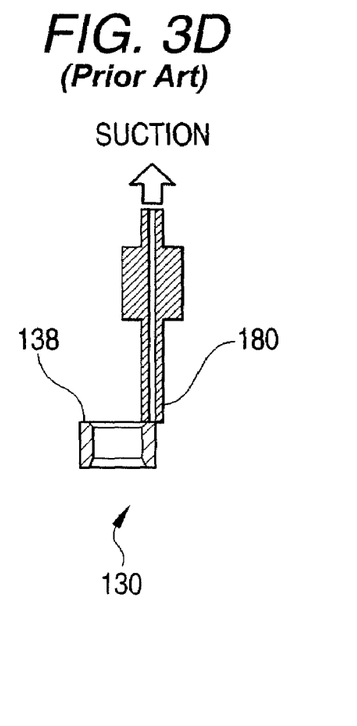
Figure 4:
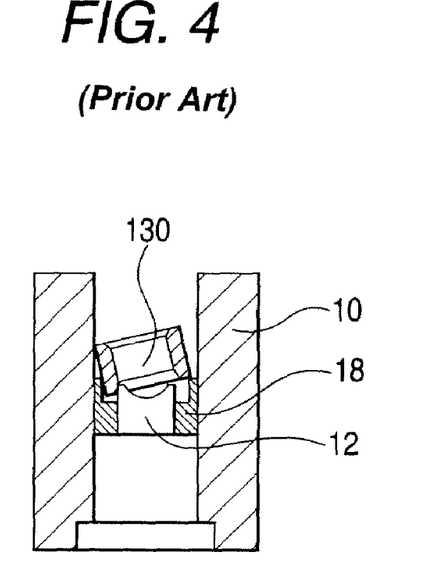
FIG. 4 is a view illustrating problems in a conventional production method.

In the case where the side face 132 of the lens holder 130 is sucked as shown in FIG. 3C, the lens holder must be rotated by 90° in the barrel die, and inadequate placement of the lens holder 130 as shown in FIG. 4 easily occurs. In the case of FIG. 3D, the suction port 180 must be inserted in close proximity to the inner peripheral face of the barrel die. Therefore, it is necessary to provide a room for the insertion, and the holding becomes easily unstable. In this case also, consequently, the problem such as shown in FIG. 4 readily occurs.

SUMMARY OF THE INVENTION

The invention has been conducted in order to solve the problems. It is an object of the invention to provide a production method in which a blank for an optical element such as a lens blank, and a holder such as a lens holder can be taken simultaneously and stably into a molding die and installed correctly therein. It is another object of the invention to provide a production method in which a special space for taking a holder for an optical component into a molding die is not required, and hence the size of a production apparatus is prevented from being increased.

The method of manufacturing an optical component having an optical element and a holder attached to the optical element which is provided by the invention is basically implemented in the following steps: inserting a blank for the optical element into a through hole of the holder wherein the through hole has a narrowed portion at which the blank is prevented from passing through the through hole; sucking at least the blank from an upper side thereof in a state where the blank is inserted into the through hole; transporting the holder and the blank simultaneously to a molding device; placing the blank on a molding surface of the molding device; and heating and pressurizing the blank in the molding device so that the blank is deformed to obtain a predetermined optical surface and is press-fitted to an inner face of the holder.

According to the method, when only the blank is sucked to be lifted up, the blank is caught by the narrowed portion of the through hole of the holder, and therefore also the holder can be lifted up together. When the blank and the holder are sucked together, the blank does not slip off from the holder because the narrowed portion exists in the through hole of the holder.

Therefore, the blank and the holder can be taken simultaneously and stably into the molding device, and correctly placed. The outer diameter of a suction port can be made smaller than that of the holder, and hence a special space for inserting the suction port into the molding device is not necessary. In the specification, the upward means a direction opposite to the direction in which the gravitational force acts.

Preferably, the molding device is fixed, an auxiliary member having a through hole for fixing the holder to a predetermined position with respect to the molding surface is disposed on a molding die, and the transported holder is placed at a predetermined position on the auxiliary member.

According to the configuration, the blank and the holder which are simultaneously transported can be correctly placed at the same time on the fixed molding device and the auxiliary member, respectively, and an optical component having a holder in which the optical component is correctly fixed to a predetermined position of the holder can be easily produced.

The through hole of the holder has a circular section shape, a portion which protrudes toward a center of the through hole is disposed in a part of an inner peripheral face of the through hole, the section shape of the through hole in the portion is symmetric about the center, and a minimum value of a distance passing the center is smaller than a maximum value of an external shape of the blank.

In the case where the section shape of the through hole is circular, when the above-mentioned relationships are established, the blank does not slip off from the holder. When the through hole is centrosymmetric, the end face of the holder can be easily held to an approximately horizontal state in the case where the blank is sucked and lifted, and the blank can be correctly placed in the molding device.

Preferably, the blank is circular, cylindrical, or spheroidal. In the case where the blank has such a shape, when the optical element is axisymmetric as in a lens, a molded product which is in close contact with the holder is easily configured. Here, deformation which is in the order of a shape error caused by a usual molding process is not considered in the terms of shapes such as "circular."

According to the manufacturing method of the invention, a blank for an optical element such as a lens, and a holder such as a lens holder can be taken simultaneously and stably into a molding device and installed correctly therein. Therefore, the production efficiency of an optical component having a holder can be improved. Only the blank placed in the through hole of the holder is sucked, and taken as it is into the molding device. Therefore, a special space for inserting a suction tool into the molding device is not required, and the size of a molding device can be prevented from being increased.

DETAILED DESCRIPTION OF THE PREFERRED EMBODIMENTS

Hereinafter, a method of manufacturing an aspherical lens having a holder with using the production method of the invention will be specifically described.

A molding device used in molding of the lens is basically similar to the conventional apparatus shown in FIGS. 1A through 1D, and pressurizes a lens blank by two molding dies to deform it, thereby forming a lens as an optical element. Therefore, the molding surfaces of the molding dies are previously processed in accordance with the designed surface shape of an aspherical lens.

In a state before a lens blank and a lens holder are inserted, as shown in FIG. 1A, the lower die 12 (which constitutes a part of molding device) is inserted into the through hole of the cylindrical barrel die 10, and disposed so that the molding surface 15 is directed in the upward direction. The lower die 12 is not moved during a molding process. The lower die 12 has a step 13 below the molding surface 15. The sectional area of the lower portion 14 which is lower than the step 13 is larger than that of the upper portion having the molding surface 15. The inner sleeve 18 which has a through hole, and which is an auxiliary member is placed on the step 13. At this time, an upper portion of the lower die 12 is inserted into the through hole of the inner sleeve 18.

In this state, the lens blank (blank) and the lens holder (holder) are loaded into the molding dies with using method which is a characteristic of the invention.

Figure 5A:
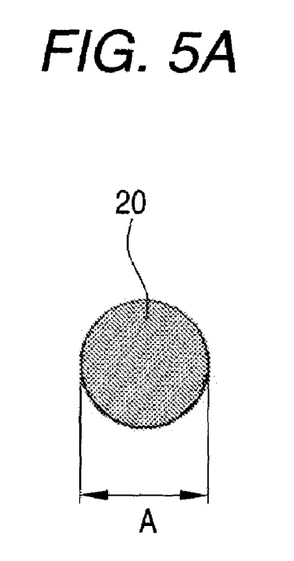
FIGS. 5A and 5B are views showing an example of a lens blank and a lens holder in the invention.

The lens blank 20 is made of a glass material, and previously processed into a spherical shape (having a diameter A) as shown in FIG. 5A.

Figure 5B:
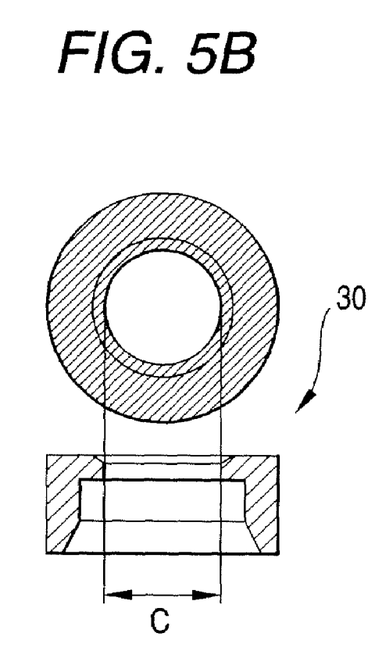

The used lens holder 30 is made of a metal material and cylindrical as shown in FIG. 5B, and has a through hole having a circular section shape. In order to allow the lens blank to be inserted only, the shape of the conventional example such as shown in FIG. 2B may be used. In order to employ the production method of the invention, the through hole of the lens holder 30 must be partly narrowed so that the lens blank cannot pass therethrough.

In the example of FIG. 5B, an inward protruding portion 33 is disposed so that the diameter of the through hole is reduced in one end portion, or a portion of the through hole is narrowed so as to be smaller than the other portion. When an article which is molded into a spherical shape of a diameter A as shown in FIG. 5A is used as the lens blank 20, the diameter C of the narrowed portion in the through hole of the lens holder 30 is made smaller than the diameter A of the lens blank 20 (C<A). Of course, the diameter B of the through hole in the portion into which the lens blank 20 is to be inserted must be larger than the diameter A of the lens blank.

Figure 6:
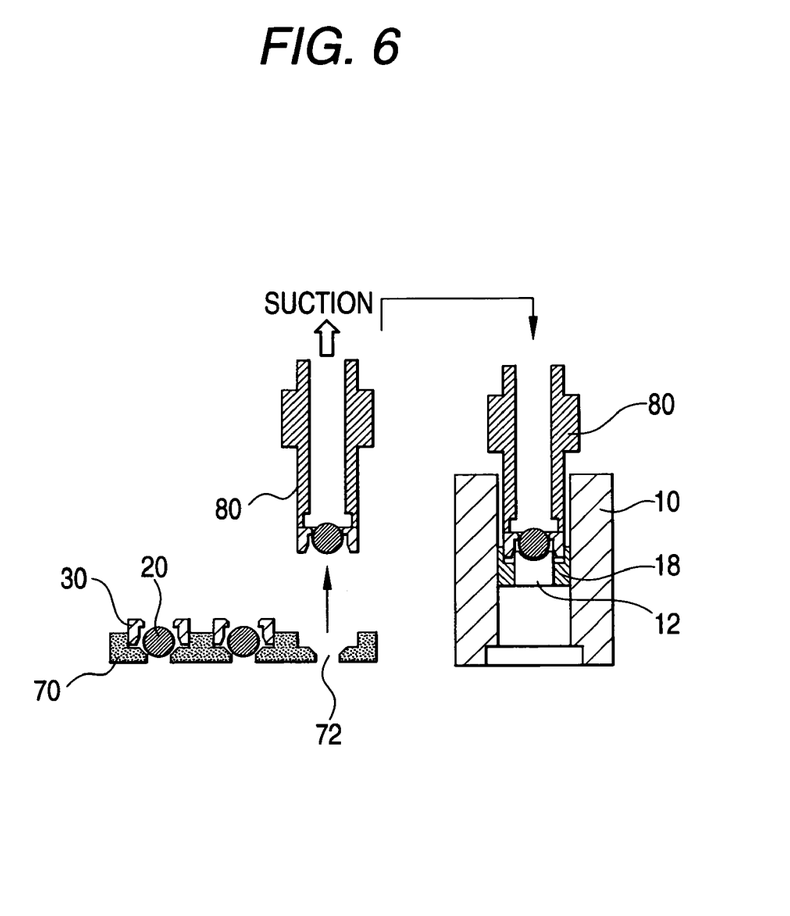
FIG. 6 is a view illustrating a method of transporting a lens holder and a lens blank in the invention.

The lens blank 20 and the lens holder 30 are prepared while being placed on a pallet 70 as shown in FIG. 6. The pallet 70 has plural recesses or hole portions 72 in each of which a step is formed between a part for supporting the spherical lens blank 20 and that for supporting the lens holder 30, so that plural lens blanks and lens holders can be held while being placed on the pallet. As shown in FIG. 6, the lens holder 30 is placed on the pallet while the narrowed side of the through hole is positioned in the upper side so as to cover the spherical lens blank 20.

By arranging plural pairs of the lens blanks 20 and the lends holders 30 on the pallet 70 in a state that each lens blank 20 is inserted in the through hole of the corresponding lens holder 30. By such the preparation with the pallet 70, continuous manufacturing of a large number of the optical components can be performed.

Figure 7A:
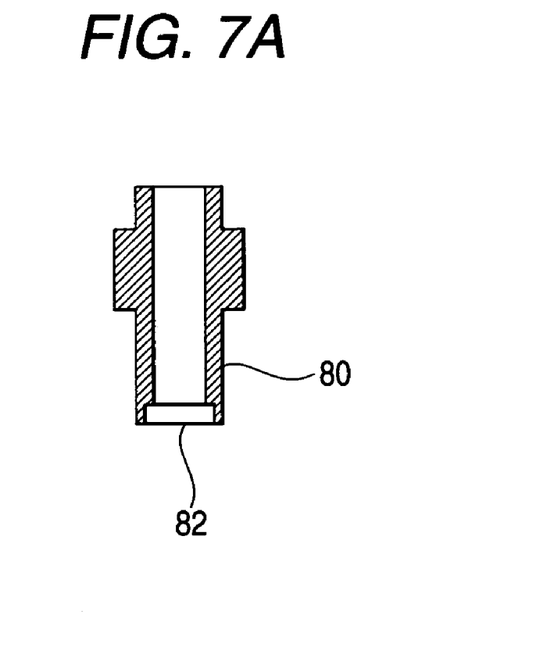
FIGS. 7A through 7C are sectional views of a suction port of a sucking device.
Figure 7B:
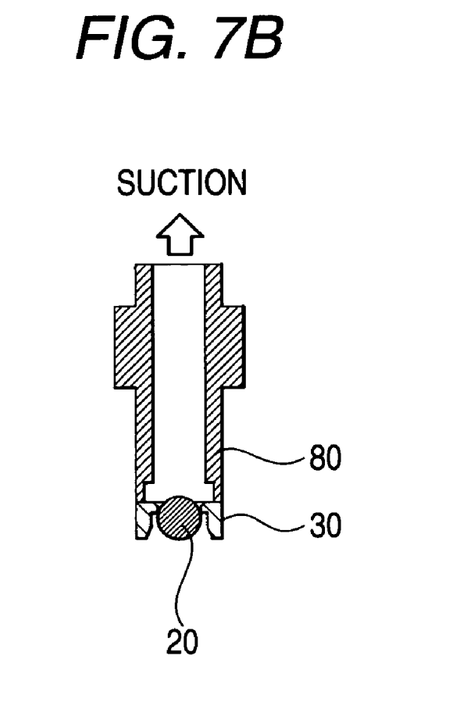

In the initial stage of the molding step, the lens blank 20 and the lens holder 30 which are on the pallet are simultaneously transported into the molding device. The transportation is conducted by means of suction. As shown in FIG. 7A, a suction port 80 of a sucking device has a flat end face 82 having a required perpendicularity. In the case where the suction port 80 having an outer diameter which is substantially equal to the outer diameter of the lens holder 30 as shown in FIG. 7B is used, the lens blank and lens holder are sucked together. Even when such suction is conducted, the lens blank 20 does not slip off from the lens holder 30 because the upper end of the through hole of the lens holder is narrowed.

Figure 7C:
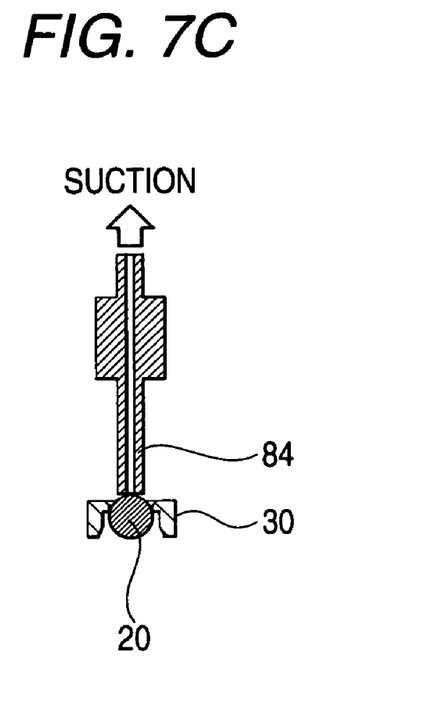

In the case where a suction port 84 having an outer diameter which is smaller than the diameter of the through hole of the lens holder is used, only the lens blank 20 is sucked. Even when only the lens blank 20 is sucked to be lifted, the lens holder 30 is caught by the lens blank 20 and does not drop, because the upper end of the through hole of the lens holder 30 is narrowed.

In both the cases, the lens blank 20 and the lens holder 30 can be simultaneously moved to a predetermined position inside the barrel die 10 as shown in FIG. 6. When the suction is cancelled at this position, or when a process of back blow is conducted in some cases, the lens blank 20 and the lens holder 30 are separated from the end face of the suction port 80. As a result of the above, the lens blank 20 and the lens holder 30 are set simultaneously and accurately to predetermined positions on the molding surface of the lower die 12 and the inner sleeve 18, respectively.

Figure 8:
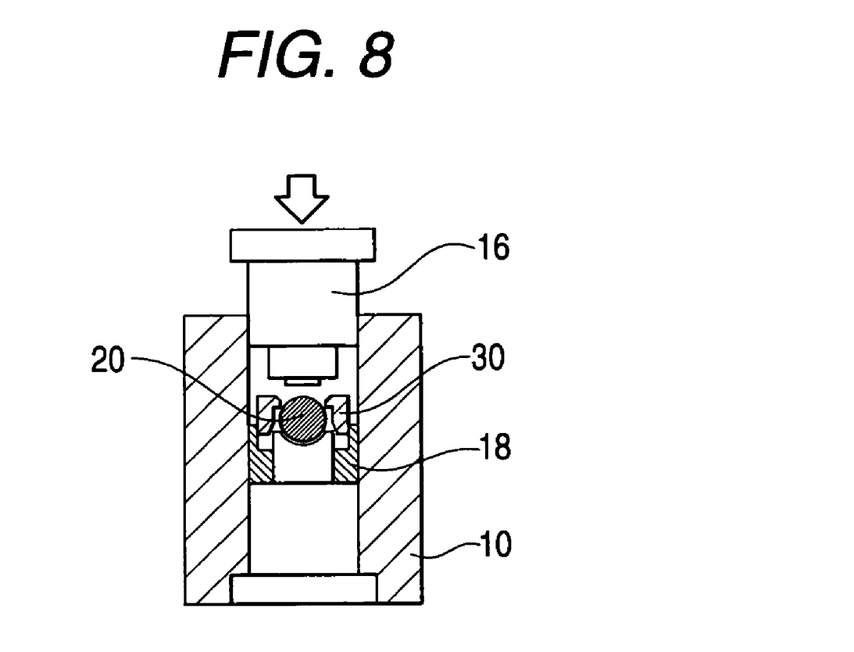
FIG. 8 is a view of a molding device according to the invention.

Thereafter, an upper die (second molding die) 16 is inserted and lowered into the barrel die 10 with downward directing the molding surface as shown in FIG. 8. The lens blank 20 is heated to a temperature at which the blank is softened, and pressurized between the upper and lower molding dies 16, 12. When the volume of the lens blank 20 is previously set to a predetermined value, the lens blank 20 is deformed by the pressurization, with the result that a molding product 22 is obtained which is in close contact with the inner peripheral face of the lens holder 30, and which is molded into the surface shape of an aspherical lens defined by the molding surfaces of the molding dies as shown in FIG. 9.

Figure 9:
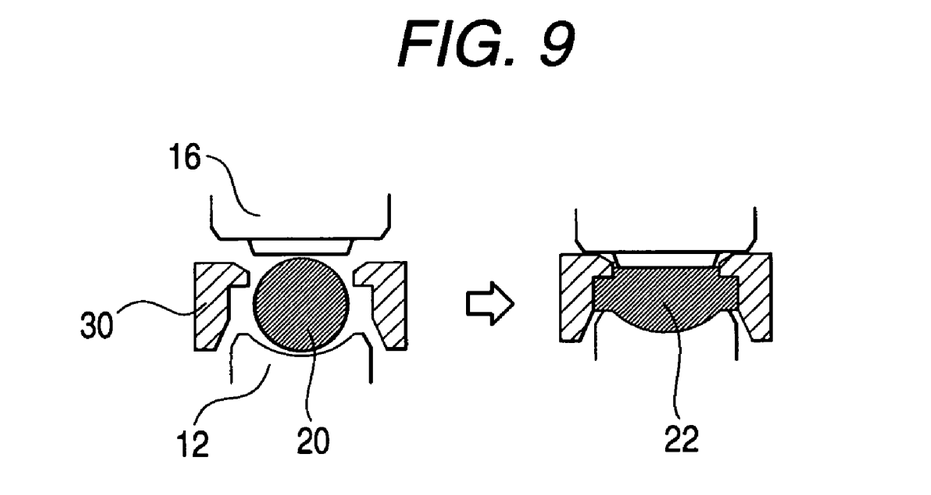
FIG. 9 is a view showing a process of molding a lens in the invention.

FIG. 9 shows molding of a plano-convex lens in which the molding surface of the lower die 12 is aspheric and that of the upper die 16 is flat. However, this is only a example. Alternatively, the lower die may have a flat face, and the upper die may have an aspheric face, or the both faces of the lens may be convex.

After the molding product 22 is formed and press-fitted to the lens holder 30, the molding product 22 is sucked and removed from the barrel die 10. Such a sucking transportation is conducted in a similar manner to the transportation of the lens blank 20 and the lens holder 30 into the barrel die 10 as shown in FIGS. 6 and 7. Since the molding product 22 has been integrated with the lens holder 30, even when only the molding product 22 is sucked to be lifted, the lens holder 30 is secured to the molding product 22 and does not drop.

The above-described embodiment can attain the following effects.

(1) The vacuum condition which enables the suction operation is obtained by closing the through hole of the lens holder with the lens blank. At the same time as the lens blank, the lens holder can be sucked in the direction toward the through hole. Therefore, the lens blank and the lens holder can be simultaneously transported.

(2) Since the outer diameter of the end face of the suction port can be made equal to or smaller than that of the lens holder, a space into which the lens holder can be inserted is sufficient for enabling transportation and insertion.

(3) In the suction process, positioning and fixation are enabled by butting the end face of the suction port against that of the lens holder. Therefore, high accuracy can be achieved in the position and inclination in the case where the lens holder is set in the molding dies.

The production method can be applied also to an optical component having a holder, other than an aspherical lens and a spherical lens. Examples of such an optical component are a Fresnel lens having a minute concave and convex structure, a diffractive optical element such as a diffraction grating, and a prism.

Figure 10A:
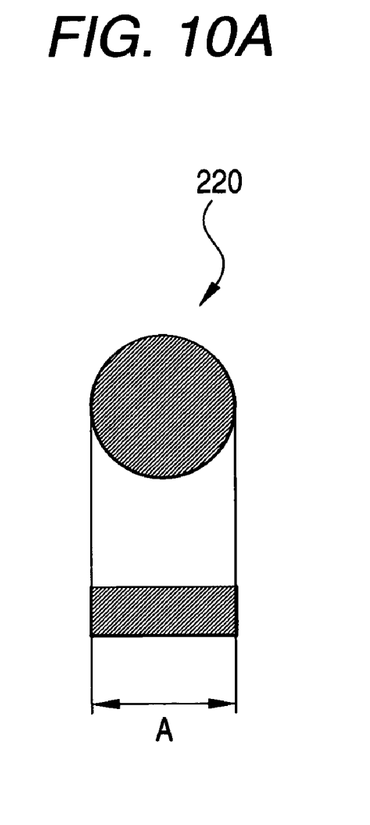
FIGS. 10A and 10B are views showing other examples of the shape of the lens blank.
Figure 10B:
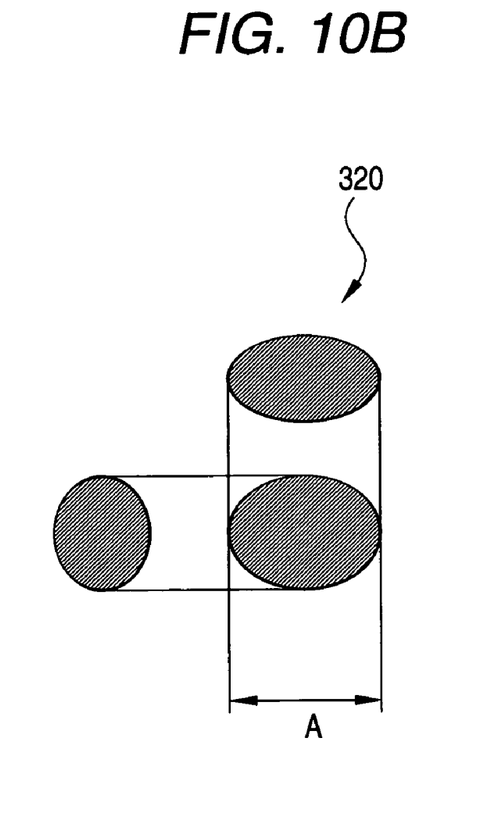

The shape of the blank is not restricted to a spherical shape, and may be a cylindrical shape or a disk-like shape shown in FIG. 10A, a spheroidal shape shown in FIG. 10B, or the like. In this case, the diameter of the cylinder or the disk is considered to be equivalent to the diameter A of the sphere shown in FIG. 5A, and the diameter C of the through hole in the narrowed portion of the holder shown in FIG. 5B is requested to satisfy the relationship of C<A. In the case of a spheroid, the maximum width is considered as A, and then the same is applicable.

The section shape of the through hole of the holder is not always necessary to be circular, depending on the shape of the optical element to be held. In order to conduct the pressure molding, however, it is preferable that the section shape is centrosymmetrical.

The narrowed portion of the through hole is not always necessary to have a similar shape as the section of the other portion of the through hole as in the case of the holder 30 shown in FIG. 5B. The through hole is requested to have a structure in which the blank cannot linearly pass through the through hole in at least one direction.

Figure 11A:
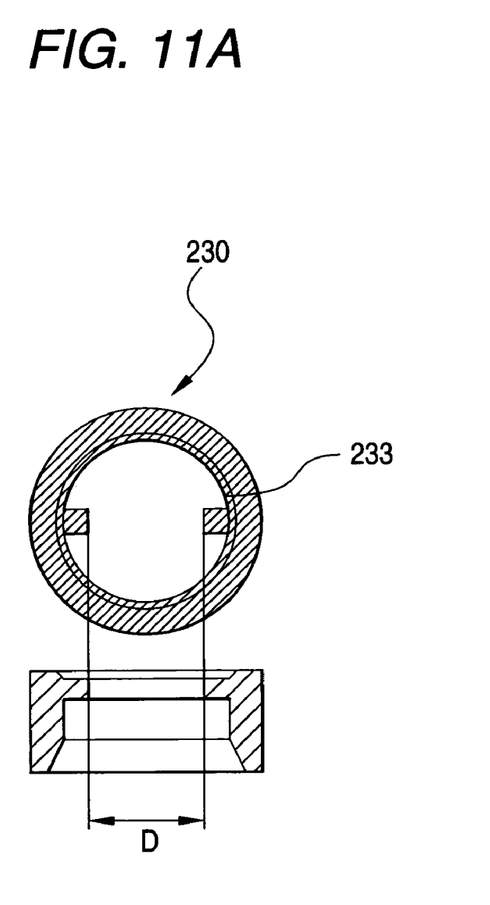
FIGS. 11A and 11B are views showing other examples of the shape of the lens holder.
Figure 11B:
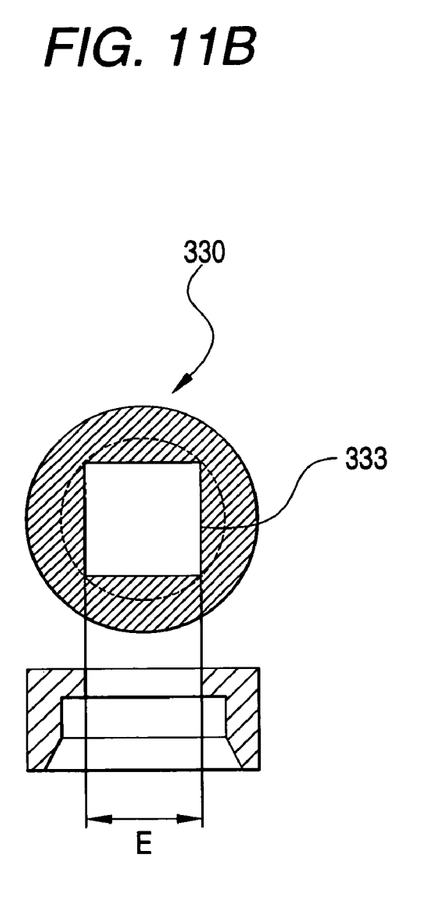

For example, as in the case of a holder 230 shown in FIG. 11A, plural convex portions 233 protruding toward the center may be disposed on the inner peripheral face of through hole so as to be symmetrical about the center of the through hole. The minimum value of the distance between the tip ends of the convex portions, i.e., the distance passing the center is indicated as D. When the relationship of D<A is satisfied, the blank cannot pass through the through hole. Alternatively, as in the case of a holder 330 shown in FIG. 11B, an opening 333 may have a square section shape. Also in the alternative, when the minimum value of the distance of the square opening passing the center of the through hole is indicated as E, E is requested to satisfy the relationship of E<A.

Other shapes may be employed as means for narrowing the through hole. In order to prevent the blank from being inclined or positionally displaced, a shape which is symmetric about the center of the through hole is preferably employed.

What is claimed is:

1. A method of manufacturing an optical component having an optical element and a holder attached to said optical element, comprising the steps of:
    inserting a blank for an optical element into a through hole of a holder wherein said through hole has a narrowed portion at which said blank is prevented from passing through said through hole;
    sucking at least said blank from an upper side thereof in a state where said blank is inserted into said through hole;
    transporting said blank and said holder simultaneously to a molding device;
    placing said blank on a molding surface of said molding device; and
    heating and pressurizing said blank in said molding device so that said blank is deformed into said optical element having a predetermined optical surface and is press-fitted to an inner face of said holder.

2. A method of manufacturing an optical component according to claim 1, wherein said molding device is fixed, an auxiliary member having a through hole for fixing said holder to a predetermined position with respect to said molding surface is disposed on a molding die of said molding device, and said holder is transported at a predetermined position on said auxiliary member.

3. A method of manufacturing an optical component according to claim 1, wherein said through hole of said holder has a circular section shape, a portion which protrudes toward a center of said through hole is disposed in a part of an inner peripheral face of said through hole, the section shape of said through hole in said portion is symmetric about a center, and a minimum value of a distance passing the center is smaller than a maximum width of an external shape of said blank.

4. A method of manufacturing an optical component according to claim 3, wherein said blank is circular, cylindrical, or spheroidal.

5. A method of manufacturing an optical component according to claim 4, wherein said optical component is a lens.

6. A method of manufacturing an optical component according to claim 1, wherein said optical component is sucked and removed from said molding device, after said optical element is formed and press-fitted to said holder.

7. A method of manufacturing an optical component according to claim 1, wherein a plurality pairs of the blank and the holder are arranged on a pallet in a state that each blank is inserted into the through hole of the corresponding holder.

* * * * *